3,359,272
LOWER ALKENYL PYRIDINE CARBONATES
Godfrey Wilbert, Carmel, and Seymour Hyden, Spring Valley, N.Y., assignors to Nepera Chemical Co., Inc.
No Drawing. Filed Apr. 25, 1966, Ser. No. 544,845
4 Claims. (Cl. 260—295.5)

ABSTRACT OF THE DISCLOSURE

The present invention relates to novel lower alkenyl pyridine carbonates, which may be represented by the following structual formulas:

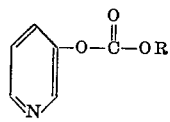

and

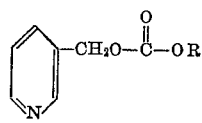

wherein R is lower alkenyl.

These compounds are useful as monomers in certain polymerization reactions.

This application is a continuation-in-part of our copending application Ser. No. 412,848 filed Nov. 20, 1964, now abandoned.

This invention relates to a composition of matter and relates more particularly to pyridine carbonates of the formula:

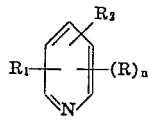

wherein R represents

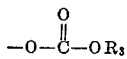

or

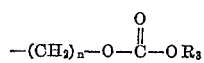

in which $R_3$ represents lower alkenyl of 2 to 6 carbons such as allyl and $R_1$ and $R_2$ which may be the same or different represent hydrogen, lower alkyl of 1 to 6 carbon atoms, aryl such as phenyl, lower alkenyl such as vinyl or allyl; aralkyl such as phenethyl; halogen; haloalkyl; aroyl such as benzoyl, or heterocyclic such as pyridyl, pyrimidyl and the like and $n$ is from 1 to 2.

Exemplary of the compounds of the invention are allyl-3-pyridyl carbonate, allyl-3-pyridylmethyl carbonate, allyl-2-methyl-3-pyridyl carbonate, allyl-2-($\beta$-pyridylethyl)carbonate, allyl-4-($\gamma$-pyridylpropyl)carbonate and the like. Diols may also be employed to afford bis-carbonates.

The compounds of this invention are valuable as monomers for the preparation of polymers useful as film forming agents in lacquers or resins. For use as a monomer these compounds may be polymerized with catalysts such as benzoyl peroxide at 60–80° C. or by ultra-violet light to yield non-thermoplastic resins useful for laminating. They may also be copolymerized with other unsaturated monomers to form compositions useful as coating agents.

The compounds of this invention may be prepared by treating allyl chloroformate with $R_1$ and $R_2$ substituted 3-hydroxypyridine or $R_1$ and $R_2$ substituted pyridine carbinols. The reaction may be effected at a temperature of 5° to 50° C. in a solvent system consisting of pyridine. The reaction product is generally recovered by distillation.

In order to further illsutrate the practice of this invention, the following examples are given:

EXAMPLE 1

Allyl-3-pyridyl carbonate

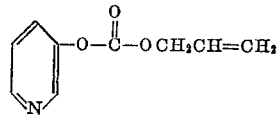

9.5 g. of 3-hydroxypyridine are dissolved in 30 ml. of pyridine and cooled to 5° C. 12 g. of allyl chloroformate are added drop wise with stirring at a temperature of 5° to 50° C. The reaction mixture is warmed to room temperature, stirred for 1 hour and then added to 150 ml. of ice water. The mixture is extracted with ether and the ethereal layer is dried. Allyl-3-pyridyl carbonate is obtained by distillation and distills over at 95°–96° C./1–2 mm.; $n_D^{22}=1.5023$. The infra-red spectrum features a band at 1750 cm.$^{-1}$.

EXAMPLE 2

Allyl-3-pyridylmethyl carbonate

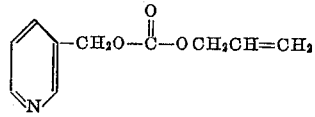

In analogous fashion as described in Example 1, allyl-3-pyridylmethyl carbonate is prepared by reacting pyridine-3-carbinol with allyl chloroformate. When distilled over this compound has a B.P. of 116°–117° C./1–2 mm.; $n_D^{21}=1.5050$. The infra-red spectrum features a band at 1725 cm.$^{-1}$.

It is understood that the foregoing detailed description is given merely by way of illustration and that many variations may be made therein without departing from the spirit of our invention.

Having described our invention, what we desire to secure by Letters Patent is:

1. A compound of the formula:

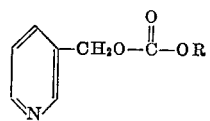

wherein R is lower alkenyl.

2. A compound of the formula:
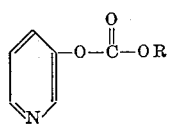
wherein R is lower alkenyl.
3. Allyl-3-pyridylmethyl carbonate.
4. Allyl-3-pyridyl carbonate.
References Cited
UNITED STATES PATENTS
3,284,459  11/1966  Wilbert et al. _____ 260—294.8
OTHER REFERENCES
Lowy et al.: Introduction to Organic Chemistry, Wiley, p. 213 (1945).
JOHN D. RANDOLPH, *Primary Examiner.*
A. L. ROTMAN, *Assistant Examiner.*